United States Patent
Ma et al.

(10) Patent No.: US 11,585,367 B2
(45) Date of Patent: Feb. 21, 2023

(54) INSTALLATION NUT

(71) Applicant: Xiamen Lota International Co., Ltd., Fujian (CN)

(72) Inventors: Qingshui Ma, Fujian (CN); Huosheng Zhan, Fujian (CN); Dezheng Yu, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 380 days.

(21) Appl. No.: 15/930,486

(22) Filed: May 13, 2020

(65) Prior Publication Data

US 2020/0362904 A1   Nov. 19, 2020

(30) Foreign Application Priority Data

May 15, 2019   (CN) .......................... 201910405893.0

(51) Int. Cl.
*F16B 39/12*   (2006.01)
*F16B 37/08*   (2006.01)
*F16B 37/14*   (2006.01)

(52) U.S. Cl.
CPC ........ *F16B 39/126* (2013.01); *F16B 37/0807* (2013.01); *F16B 37/145* (2013.01)

(58) Field of Classification Search
CPC .. F16B 37/0807; F16B 37/0864; F16B 39/28; F16B 37/041; F16B 37/145

USPC .......................................... 411/433, 267, 270
See application file for complete search history.

(56) References Cited

U.S. PATENT DOCUMENTS

2014/0182708 A1*   7/2014   Ye .......................... E03C 1/0401
                                                              137/315.01

FOREIGN PATENT DOCUMENTS

CN   108560647 A   9/2018

* cited by examiner

*Primary Examiner* — Victor D Batson
*Assistant Examiner* — Dil K. Magar
(74) *Attorney, Agent, or Firm* — Cooper Legal Group, LLC

(57) ABSTRACT

An installation nut includes a body, an upper cover, at least two threaded blocks, and a transmission member. The upper cover is fixedly connected to the body. An inner wall of each of the at least two threaded blocks includes an internal thread, and an outer wall of each of the at least two threaded blocks includes a first inclined surface and a first straight surface. The transmission member is movably disposed between the body and the upper cover. A top surface of the transmission member includes one or more transmission blocks configured to extend out of the upper cover. A lower end of the transmission member includes at least one second straight surface configured to couple with the first straight surfaces and at least one second inclined surface configured to couple with the first inclined surfaces.

9 Claims, 6 Drawing Sheets

INSTALLATION NUT

RELATED APPLICATIONS

This application claims priority to Chinese Patent Application 201910405893.0, filed on May 15, 2019. Chinese Patent Application 201910405893.0, is incorporated herein by reference.

FIELD OF THE DISCLOSURE

The present disclosure relates to an installation nut.

BACKGROUND OF THE DISCLOSURE

At present, existing kitchen faucets are usually installed near the wall and are limited by a shape of a stainless steel sink. A space for locking the existing kitchen faucets under a countertop is very small, and most of the existing kitchen faucets and a sink to which the existing kitchen faucets are coupled are fixed by a screw-in connector. With respect to current locking operations of a threaded nut and a threaded rod, the threaded nut is configured to be rotated from a lower end of the threaded rod. A thickness of the countertop defines an effective length of the threaded rod, which determines the effective length of the threaded nut when it is to be screwed to the threaded rod. The space under the countertop is very small, and therefore an operation space for screwing the threaded nut to the threaded rod is limited. A screwing operation of the threaded nut is therefore time consuming and laborious.

In view of the present situation, quick assembly-disassembly threaded nuts are manufactured. For example, an energy-saving and easy-to-install device applied to the faucet of a kitchen is disclosed in the Chinese patent publication number CN108560647A. Although the quick assembly-disassembly threaded nuts are configured to achieve fast assembly-disassembly, an upper casing and a threaded block of the threaded nut are contacted by a first inclined surface and at least one second inclined surface of the threaded nut. If the upper casing is slightly retracted during an assembly process, the threaded block will move outward, and a clamping force will be lost between the threaded block and a pipe joint of the threaded rod, so the assembly is unreliable or prone to failure. A guide post of the upper casing is further provided with a second inclined surface which extends outward from a side of a through hole and extends downward. Such a second inclined surface does not form a full circle, and is similar to a cantilever structure. When subjected to a force, a bending deformation is easily caused, resulting in the threaded block moving outward, and the clamping force is lost between the threaded block and a pipe joint, so the installation is unreliable or prone to failure.

BRIEF SUMMARY OF THE DISCLOSURE

The present disclosure provides an installation nut intended to solve deficiencies of the existing techniques. In order to solve the aforementioned technical problems, a technical solution of the present disclosure is as follows.

An installation nut configured to thread with to a threaded rod, the installation nut comprises a body comprising a first through hole, an upper cover, at least two threaded blocks, and a transmission member. The upper cover is fixedly connected to the body and comprises a second through hole corresponding to the first through hole. An inner wall of each of the at least two threaded blocks comprises an internal thread, and an outer wall of each of the at least two threaded blocks comprises a first inclined surface and a first straight surface. The transmission member is movably disposed between the body and the upper cover and is configured to move in a vertical direction. A top surface of the transmission member comprises one or more transmission blocks configured to extend out of the upper cover. A lower end of the transmission member comprises at least one second straight surface configured to couple with the first straight surfaces of the at least two threaded blocks and at least one second inclined surface configured to couple with the first inclined surfaces of the at least two threaded blocks. When the installation nut surrounds an outer side of the threaded rod and upwardly abuts a countertop, the one or more transmission blocks move downward and drive the at least two threaded blocks to move toward a central axis of the at least two threaded blocks until the at least two threaded blocks are locked with the threaded rod by cooperation of the first inclined surfaces of the at least two threaded blocks and the at least one second inclined surface. When the at least two threaded blocks are locked with the threaded rod, the first straight surfaces of the at least two threaded blocks abut an inner side of the at least one second straight surface to limit the at least two threaded blocks from moving in a radial direction of the at least two threaded blocks.

In a preferred embodiment, the transmission member defines an annular closed structure.

In a preferred embodiment, a cross-section of the at least one second inclined surface defines a closed ring.

In a preferred embodiment, the installation nut further comprises a C-ring. The inner wall of each of the at least two threaded blocks comprises a C-ring groove, and the C-ring is disposed in the C-ring grooves.

In a preferred embodiment, the installation nut further comprises an elastic reset member, and two ends of the elastic reset member respectively abut the transmission member and the body.

In a preferred embodiment, at least one of the first inclined surfaces of the at least two threaded blocks or the first straight surfaces of the at least two threaded blocks comprises one or more grooves.

In a preferred embodiment, the upper cover comprises one or more through holes. The one or more transmission blocks extend into the one or more through holes and are configured to move in the vertical direction along the one or more through holes.

In a preferred embodiment, the upper cover comprises one or more locking buttons extending downward, and an inner wall of the first through hole comprises one or more locking grooves. The upper cover is fixedly connected to the body through a clamping cooperation of the one or more locking buttons and the one or more locking grooves.

In a preferred embodiment, a mounting seat is disposed between the installation nut and the countertop.

Compared with existing techniques, the technical solution provided by the present disclosure has the following advantages.

1. Each of the at least two threaded blocks comprises a first straight surface, and the transmission member comprises a second straight surface. When the at least two threaded blocks are locked with the threaded rod, the at least two first straight surfaces abut an inner side of the at least one second straight surface to limit the at least two threaded blocks from moving in a radial direction of the at least two threaded blocks, so an outward movement of the at least two threaded blocks caused by a looseness of the transmission member, resulting in a loss of an engagement force with the threaded rod, is avoided. A locking state of the at least two threaded blocks and the threaded rod can be ensured before the at least two threaded blocks and the threaded rod are unlocked, so an assembly of the installation nut and the threaded rod is more reliable.

2. The one or more transmission blocks extend into the one or more through holes and are configured to move in the vertical direction along the one or more through holes. The cooperation between the one or more transmission blocks and the one or more through holes is configured to guide the transmission member to move in the vertical direction and to prevent the transmission member from shifting during a vertical movement of the transmission member.

3. A shape of the cross-section of the at least one second inclined surface is a closed ring. A structural strength of the at least one second inclined surface is better and is not easy to bend and deform, so the at least two threaded blocks are more difficult to separate from the thread rod.

4. The C-ring is disposed in the C-ring grooves. When the installation nut is disassembled, the C-ring is configured to push the at least two threaded blocks to move outward so that disassembly of the installation nut is faster.

5. The elastic reset member surrounds outer sides of the at least two threaded blocks and the two ends of the elastic reset member respectively abut the transmission member and the body. When the installation nut is disassembled, the elastic reset member pushes the first straight surfaces of the at least two threaded blocks to quickly move downward along the second straight surface to achieve the quick disassembly of the installation nut.

6. The first inclined surfaces or the first straight surfaces comprise one or more grooves, so a wall thickness of the at least two threaded blocks is more uniform and sizes of the at least two threaded blocks are more stable during an injection molding process of the at least two threaded blocks.

BRIEF DESCRIPTION OF THE DRAWING

The present disclosure will be further described below with the combination of the accompanying drawings and the embodiments.

DETAILED DESCRIPTION OF THE EMBODIMENTS

Referring to FIGS. 1-6, a preferred embodiment provides an installation nut configured to be coupled to a threaded rod.

The installation nut comprises a body 10, an upper cover 20, at least two threaded blocks 30, and a transmission member 40.

Figure 1:
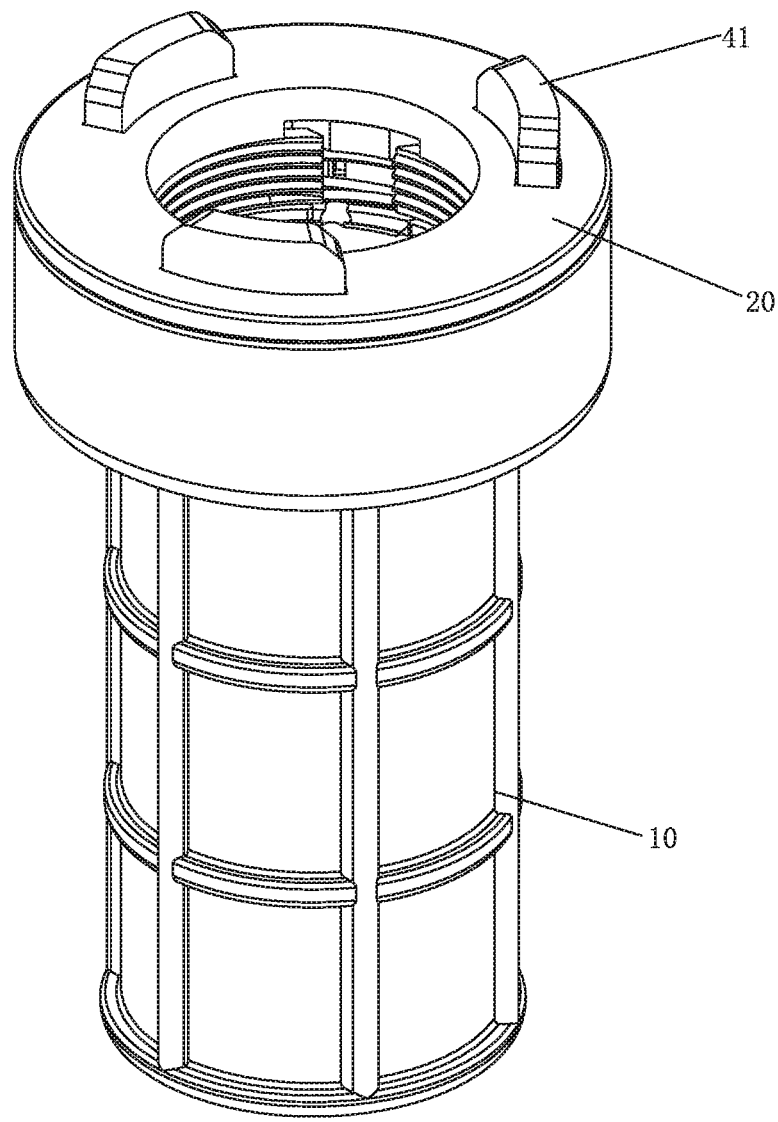
FIG. 1 illustrates a perspective view of an installation nut of Embodiment 1 of the present disclosure.
Figure 2:
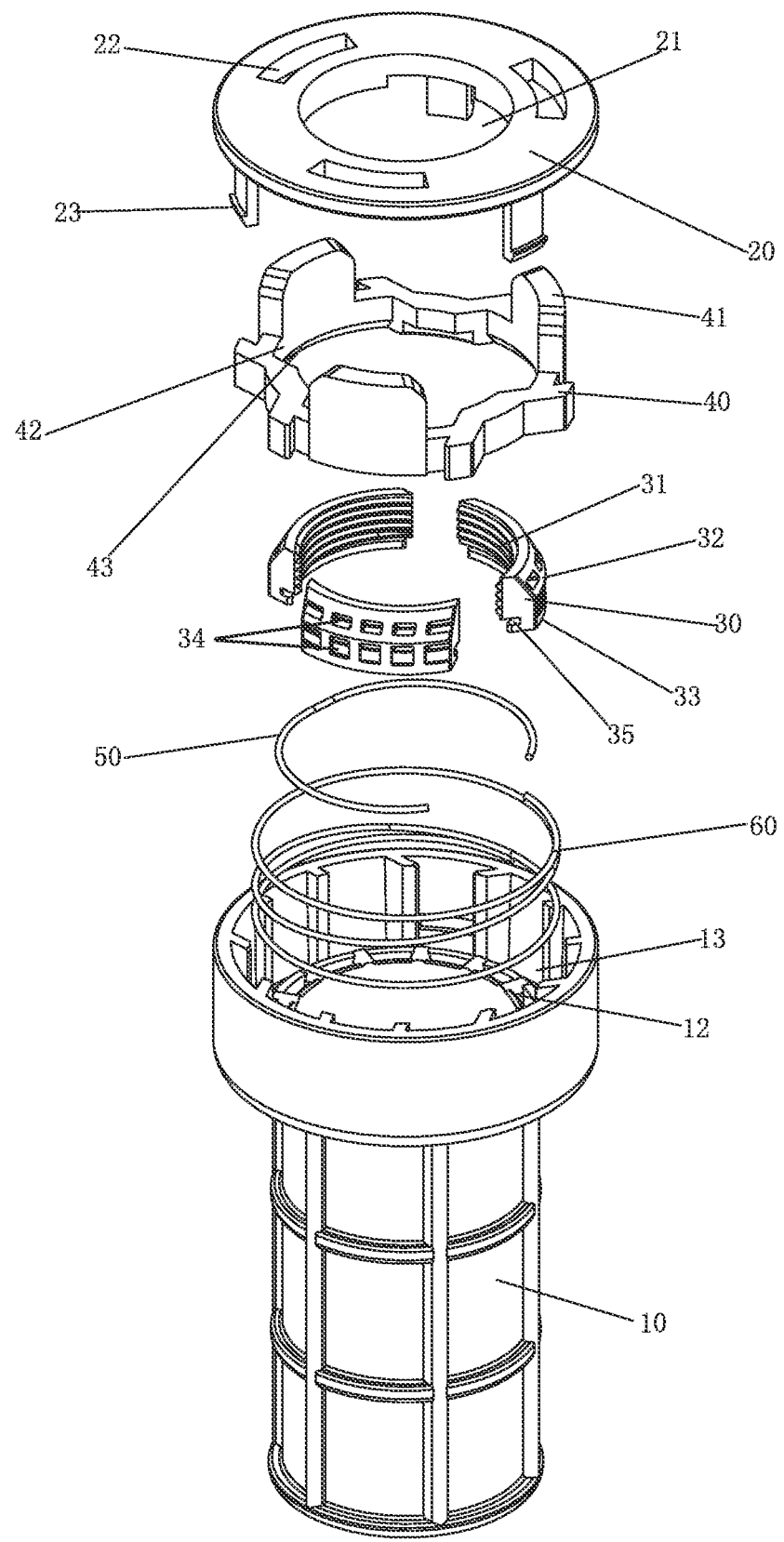
FIG. 2 illustrates an exploded perspective view of the installation nut of Embodiment 1 of the present disclosure.
Figure 3:
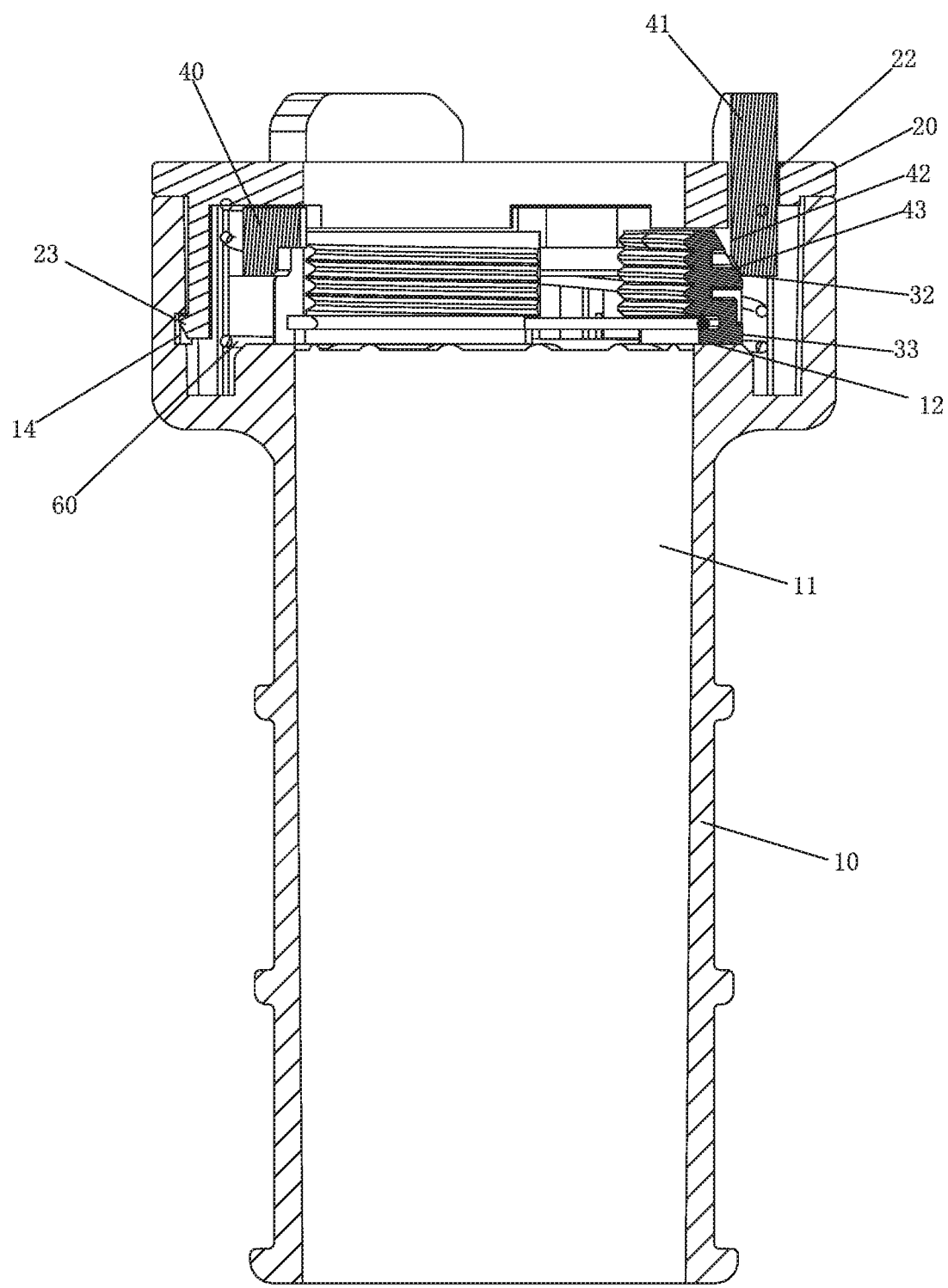
FIG. 3 illustrates a cross-sectional view of the installation nut of Embodiment 1 of the present disclosure when the installation nut is not locked with a threaded rod.

The body 10 comprises a first through hole 11. As shown in FIGS. 2 and 3, the first through hole 11 penetrates the body 10 in a vertical direction, and the first through hole 11 comprises a stepped surface 12. A space disposed above the stepped surface 12 forms an assembly cavity 13.

Figure 4:
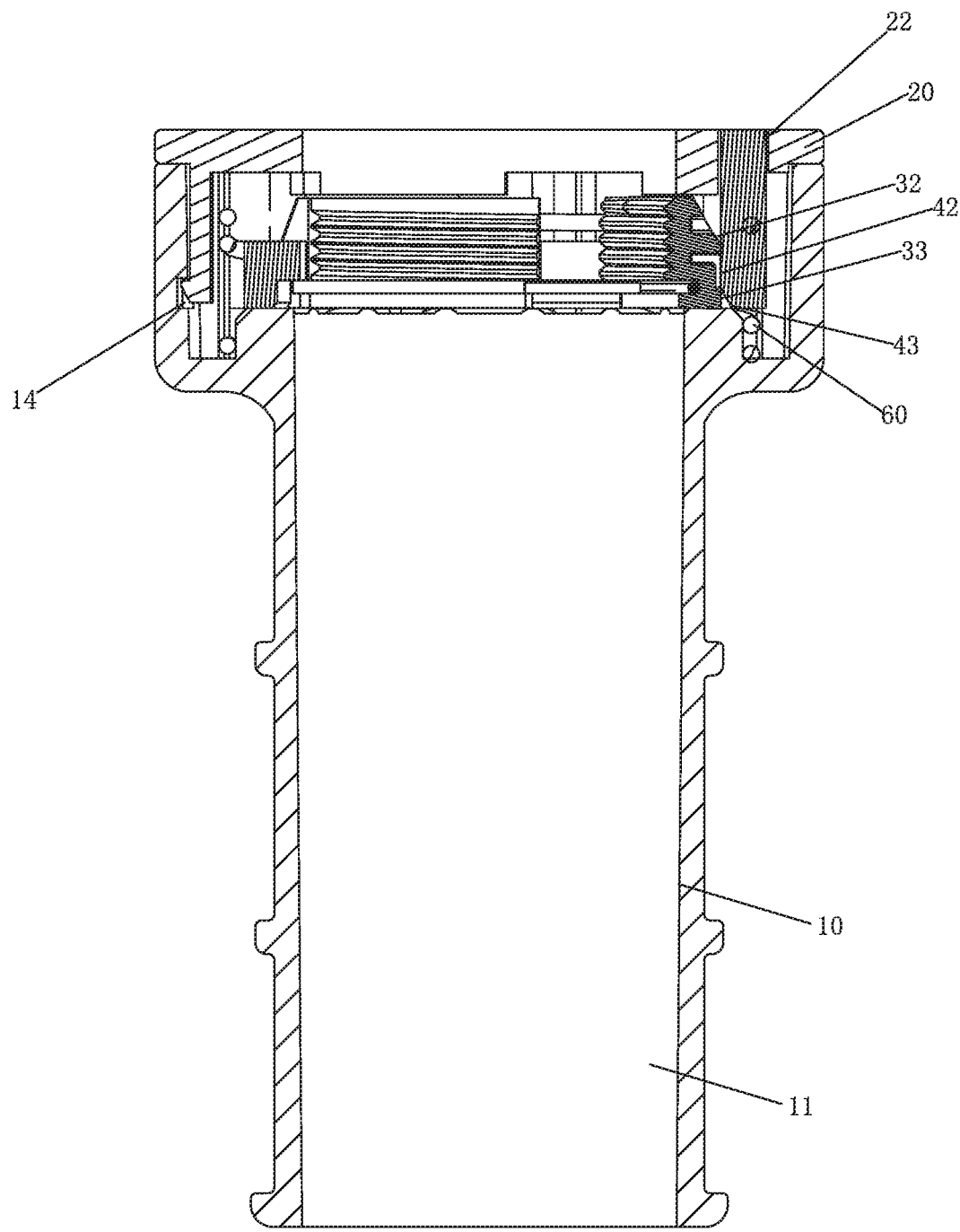
FIG. 4 illustrates a cross-sectional view of the installation nut of Embodiment 1 of the present disclosure when the installation nut is locked with the threaded rod.

In this embodiment, as shown in FIGS. 3 and 4, an inner wall of the assembly cavity 13 comprises one or more locking grooves 14. A number of the one or more locking grooves 14 comprises a plurality of locking grooves annually disposed on the assembly cavity 13 at intervals.

The upper cover 20 is fixedly connected to the body 10 and comprises a second through hole 21 corresponding to the first through hole 11.

In this embodiment, the upper cover 20 comprises one or more through holes 22. As shown in FIG. 2, a number of the one or more through holes 22 is three, and the three through holes 22 are annularly disposed at intervals. The number of the one or more through holes 22 is not limited thereto and can be two or four.

In this embodiment, the upper cover 20 extends downward to define one or more locking buttons 23, and the upper cover 20 is fixedly connected to the body 10 through a clamping cooperation of the one or more locking buttons 23 and the one or more locking grooves 14. The number of the one or more locking buttons 23 is the same as the number of the one or more lock grooves 14, and the one or more locking buttons 23 have a one-to-one correspondence with the one or more lock grooves 14.

An inner wall of each of the at least two threaded blocks 30 comprises an internal thread 31, and an outer wall of each of the at least two threaded blocks 30 comprises a first inclined surface 32 and a first straight surface 33 arranged in the vertical direction.

In this embodiment, each of the first inclined surfaces 32 and each of the first straight surfaces 33 respectively comprises a groove 34.

As shown in FIG. 2, the number of the at least two threaded blocks 30 is three. When the three threaded blocks 30 are disposed to define a circular structure, the internal threads 31 of the three threaded blocks 30 form an integral circular thread comprising a thread diameter. The integral circular thread is configured to couple with a threaded rod 1. The number of the threaded blocks 30 is not limited thereto and can be two, four, or five.

The transmission member 40 is movably disposed between the body 10 and the upper cover 20 and is configured to move in the vertical direction. A top surface of the transmission member 40 comprises one or more transmission blocks 41 configured to extend out of the upper cover 20, and a lower end of the transmission member 40 comprises at least one second straight surface 42 cooperating with the first straight surfaces 33 and at least one second inclined surface 43 cooperating with the first inclined surfaces 32. The at least one second straight surface 42 and the at least one second inclined surface 43 are arranged in the vertical direction. When the installation nut surrounds an outside of the threaded rod 1 and upwardly abuts a countertop 2, the one or more transmission blocks 41 move downward to drive the three threaded blocks 30 to move toward a central axis of the three threaded blocks 30 through the cooperation of the first inclined surfaces 32 and the at least one second inclined surface 43 until a top surface of the one or more transmission blocks 41 aligns with a top end of the upper cover 20 to enable the three threaded blocks 30 to lock with the threaded rod 1. When the three threaded blocks 30 and the threaded rod 1 are locked, the first straight surfaces 33 abut an inner side of the at least one second straight surface 42 to limit the three threaded blocks 30 from moving in a radial direction of the three threaded blocks 30, so an outward movement of the three threaded blocks 30 caused by a looseness of the transmission member 40, resulting in a loss of an engagement force with the threaded rod 1, is avoided. A locking state of the three threaded blocks 30 and the threaded rod 1 can be ensured before the three threaded blocks 30 and the threaded rod 1 are unlocked, so an assembly of the installation nut and the threaded rod 1 is more convenient.

In this embodiment, a shape of the transmission member 40 defines an annular closed structure, and the one or more transmission blocks 41 extend into the three through holes 22 and are configured to move in the vertical direction along the three through holes 22. In this embodiment, a cross-section of the at least one second inclined surface 43 defines a closed ring.

In this embodiment, the installation nut further comprises a C-ring 50. The inner wall of each of the three threaded blocks 30 further comprises a C-ring groove 35, and the C-ring 50 is disposed in the C-ring grooves 35.

In this embodiment, the installation nut further comprises an elastic reset member 60 that surrounds outer sides of the three threaded blocks 30, and two ends of the elastic reset member 60 respectively abut the transmission member 40 and the body 10.

An installation process of the installation nut is as follows.

Figure 5:
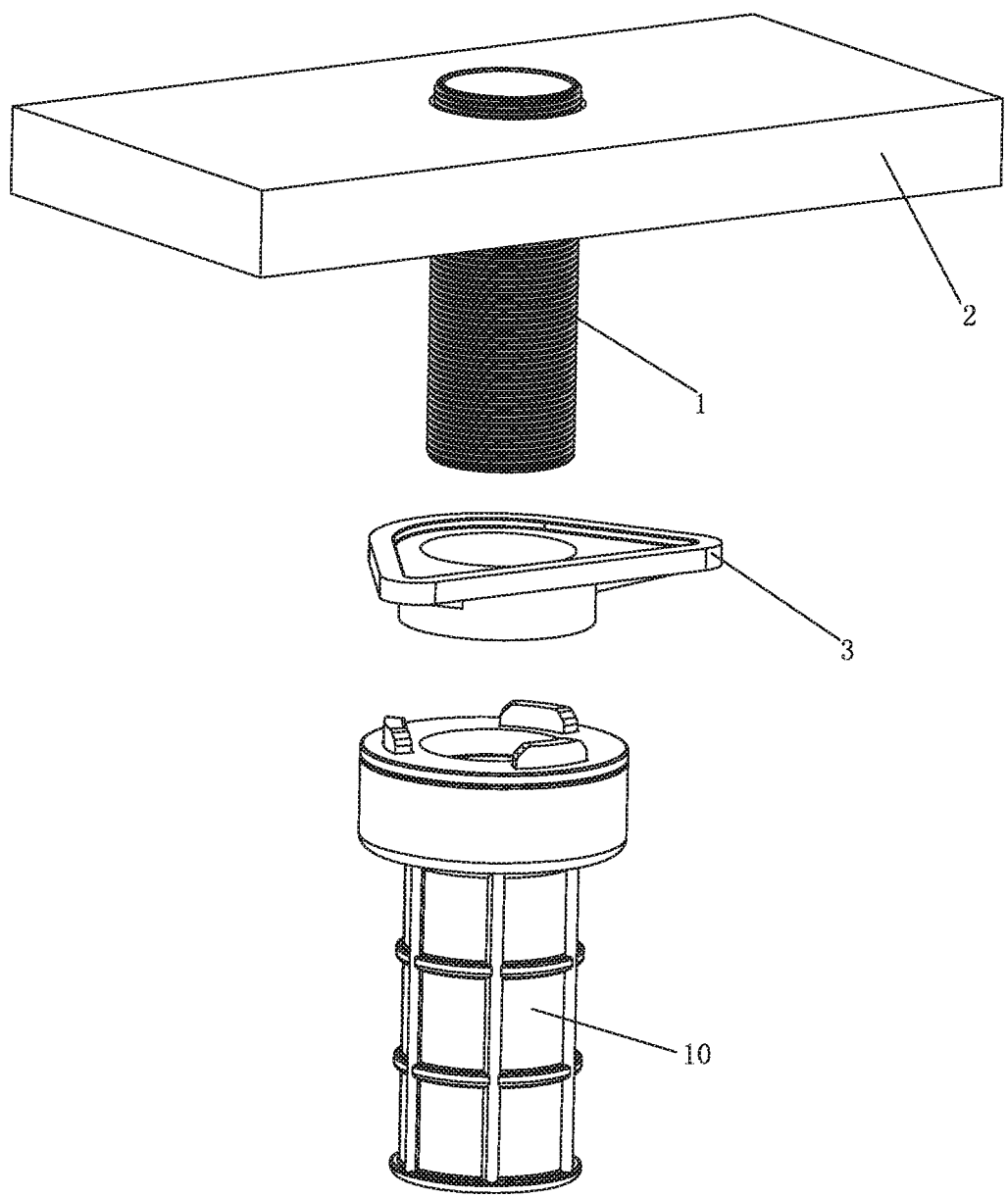
FIG. 5 illustrates an exploded perspective view of the installation nut and the threaded rod of Embodiment 1 of the present disclosure when the mounting threaded rod and the threaded rod are assembled.

As shown in FIG. 5, the threaded rod 1 is disposed on the countertop 2, and a mounting seat 3 is further disposed under the countertop 2.

Figure 6:
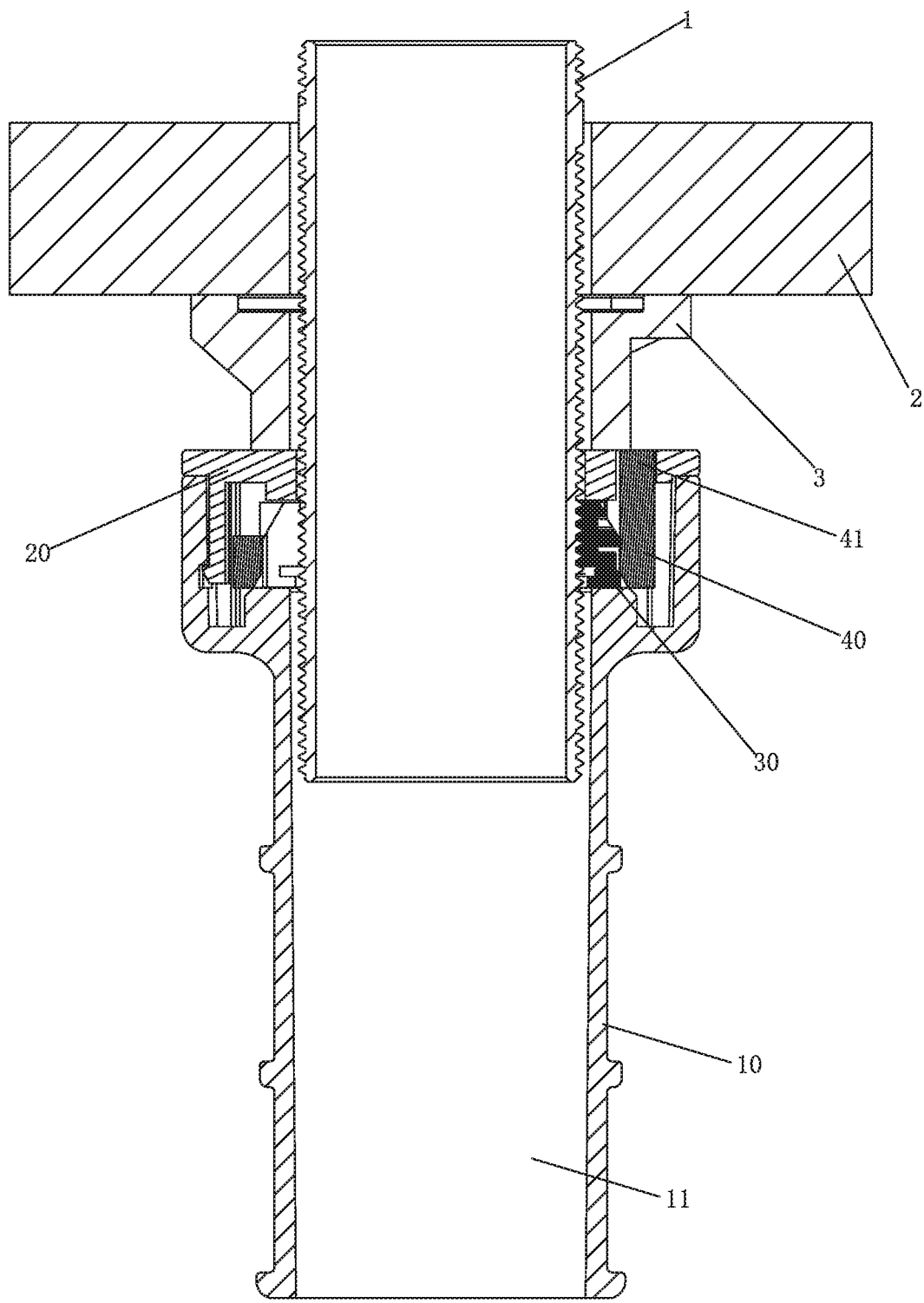
FIG. 6 illustrates a cross-sectional view of the installation nut and the threaded rod of Embodiment 1 of the present disclosure after the mounting threaded rod and the threaded rod are assembled.

First, the installation nut is aligned with the threaded rod 1. The three threaded blocks 30 define a space between each other. The installation nut is rapidly pushed up along the threaded rod 1 until a top surface of the one or more transmission blocks 41 abuts a bottom surface of the countertop 2, and then the installation nut is continued to be pushed up. A cooperation of the first inclined surfaces 32 and the at least one second inclined surface 43 drives the three threaded blocks 30 to move toward a central direction of the three threaded blocks 30 to enable the three threaded blocks 30 to be reset to define the thread diameter. The three threaded blocks 30 are rotated relative to the threaded rod 1 to tightly hold the three threaded blocks 30 with the threaded rod 1, and then the transmission member 40 continuously moves downward until the top surface of the transmission block 41 is aligned with the top surface of the upper cover 20. The first straight surfaces 33 are coupled to the inner side of the at least one second straight surface 42 to limit the three threaded blocks 30 from moving in the radial direction of the three threaded blocks 30. At this time, the three threaded blocks 30 are locked with the threaded rod 1, as shown in FIG. 6, and the installation of the threaded nut is complete. At this time, the C-ring 50 and the elastic reset member 60 are in an energy storage state.

When the installation nut is required to be disassembled, the installation nut is rotated, and then the three threaded blocks 30 are moved downward by the elastic reset member 60 to separate the first straight surfaces 33 from the at least one second straight surface 42. The first inclined surfaces 32 are reset to contact the at least one second inclined surface 43. Under a force caused by the C-ring 50, the three threaded blocks 30 move outward such that a diameter of the internal threads 31 of the three threaded blocks 30 becomes larger. When the diameter of the internal threads 31 of the three threads blocks 30 is larger than an outer diameter of the threaded rod 1, the installation nut can be removed from the threaded rod 1 to be quickly disassembled.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. An installation nut configured to thread with a threaded rod, comprising:
 a body comprising a first through hole,
 an upper cover,
 at least two threaded blocks, and
 a transmission member, wherein:
  the upper cover is fixedly connected to the body and comprises a second through hole corresponding to the first through hole,
  an inner wall of each of the at least two threaded blocks comprises an internal thread,
  an outer wall of each of the at least two threaded blocks comprises a first inclined surface and a first straight surface,
  the transmission member is movably disposed between the body and the upper cover and is configured to move in a vertical direction,
  a top surface of the transmission member comprises one or more transmission blocks configured to extend out of the upper cover,
  a lower end of the transmission member comprises at least one second straight surface configured to couple with the first straight surfaces of the at least two threaded blocks and at least one second inclined surface configured to couple with the first inclined surfaces of the at least two threaded blocks,
  when the installation nut surrounds an outer side of the threaded rod and upwardly abuts a countertop:
   the one or more transmission blocks move downward and drive the at least two threaded blocks to move toward a central axis of the at least two threaded blocks until the at least two threaded blocks are locked with the threaded rod by cooperation of the first inclined surfaces of the at least two threaded blocks and the at least one second inclined surface, and
  when the at least two threaded blocks are locked with the threaded rod:
   the first straight surfaces of the at least two threaded blocks abut an inner side of the at least one second straight surface to limit the at least two threaded blocks from moving in a radial direction of the at least two threaded blocks.

2. The installation nut according to claim 1, wherein the transmission member defines an annular closed structure.

3. The installation nut according to claim 2, wherein a cross-section of the at least one second inclined surface defines a closed ring.

4. The installation nut according to claim 1, comprising: a C-ring, wherein:
 the inner wall of each of the at least two threaded blocks comprises a C-ring groove, and
 the C-ring is disposed in the C-ring grooves.

5. The installation nut according to claim 1, comprising: an elastic reset member, wherein:

two ends of the elastic reset member respectively abut the transmission member and the body.

6. The installation nut according to claim 1, wherein at least one of the first inclined surfaces of the at least two threaded blocks or the first straight surfaces of the at least two threaded blocks comprises one or more grooves.

7. The installation nut according to claim 1, wherein:
the upper cover comprises one or more through holes, and
the one or more transmission blocks extend into the one or more through holes and are configured to move in the vertical direction along the one or more through holes.

8. The installation nut according to claim 1, wherein:
the upper cover comprises one or more locking buttons extending downward,
an inner wall of the first through hole comprises one or more locking grooves, and
the upper cover is fixedly connected to the body through a clamping cooperation of the one or more locking buttons and the one or more locking grooves.

9. The installation nut according to claim 1, wherein a mounting seat is disposed between the installation nut and the countertop.

\* \* \* \* \*